(No Model.)
L. T. SCOFIELD.
PIPE COUPLING.
No. 257,983. Patented May 16, 1882.
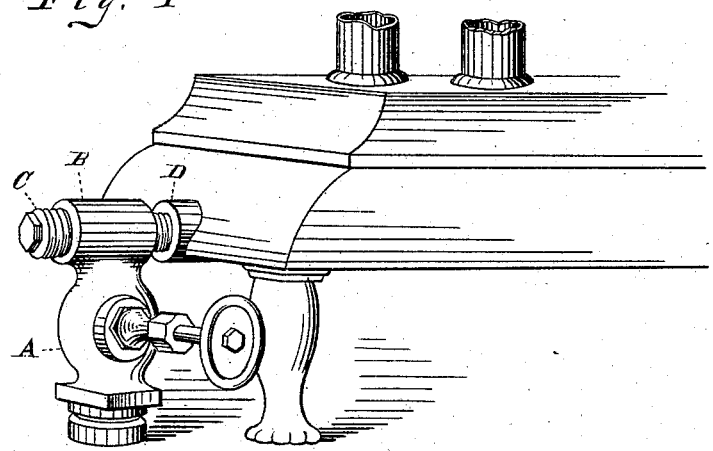
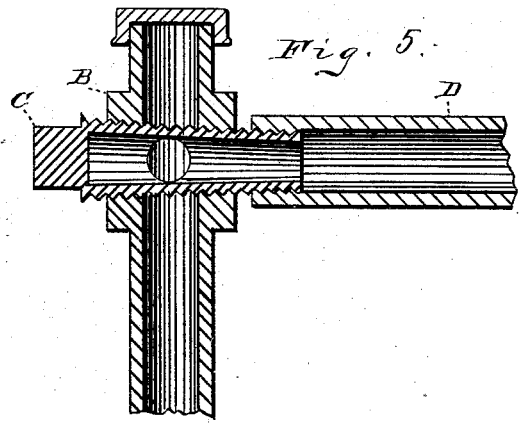
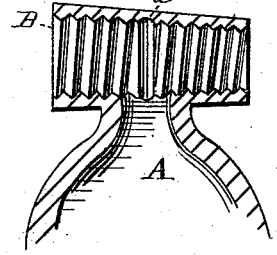
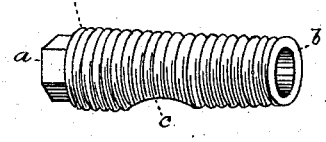
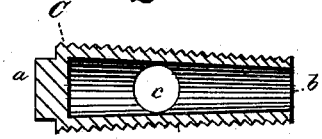
WITNESSES
INVENTOR
By
ATTORNEYS

UNITED STATES PATENT OFFICE.

LEVI T. SCOFIELD, OF CLEVELAND, OHIO.

PIPE-COUPLING.

SPECIFICATION forming part of Letters Patent No. 257,983, dated May 16, 1882.

Application December 13, 1881. (No model.)

*To all whom it may concern:*

Be it known that I, LEVI T. SCOFIELD, of Cleveland, in the county of Cuyahoga and State of Ohio, have invented certain new and useful Improvements in Pipe-Couplings; and I do hereby declare the following to be a full, clear, and exact description of the invention, such as will enable others skilled in the art to which it pertains to make and use the same.

My invention relates to pipe-couplings, and is more particularly adapted to couple pipes that run at an angle to each other; and it consists in the peculiar construction of the same, as will be hereinafter fully set forth and claimed.

In the drawings, Figure 1 is a view showing my coupling as adapted and applied to a steam-radiator. Fig. 2 is an enlarged view of my hollow plug as preferably constructed. Fig. 3 is a longitudinal vertical sectional view of the same. Fig. 4 is a sectional view of the interior of the socket or head through which the plug passes. Fig. 5 is a modification showing another manner of constructing my coupling.

A is a pipe the upper end of which is provided with a head or socket, B, the orifice of this socket being at an angle to the orifice of the pipe A.

C is a hollow plug, which is closed at one end, $a$, and open at the other, $b$, and adapted to fit in the head or socket B in such a manner that its end $b$ extends somewhat beyond the said head or socket. The interior of the plug C is made to communicate with the interior of the pipe A, by providing it with an opening, $c$, (see Figs. 2 and 3,) and providing the interior of the head or socket B with a groove, $d$, which extends around the inner circumference of said socket directly over the pipe A, and thus secures communication between the pipe A and plug C, no matter in what position the plug C may be turned, or the communication between the pipe A and plug C may be secured in many other ways, another manner being shown in Fig. 5, which will be readily understood without any explanation.

To the open end $b$ of the plug C, is connected the pipe D, to which the pipe A is to be attached, and thus communication is established between them. The contents of the pipe A flow from said pipe into the interior of the plug C, through the opening $c$, and from thence through the open end $b$, into the pipe D.

Instead of connecting the end $b$ of the plug C to the pipe D, it may be connected directly to any vessel, tank, boiler, or like supply or receiver.

What I claim is—

A coupling for securing communication between a pipe and a vessel, or between two pipes, consisting of a hollow plug open at one end and closed at the other with a hexagonal cap, so that it can be turned with a wrench, the outer surface of said plug being a male thread of tapering form and provided with a hole on its side, so that when screwed tight in a valve, vessel, or socket forming a part of the coupling, the opening will be the only communication between the pipes or pipe and vessel through the plug, said socket being provided with a grooved chamber encircling the plug at the opening, substantially as and for the purpose set forth.

In testimony whereof, I have signed my name to this specification in the presence of two subscribing witnesses.

LEVI T. SCOFIELD.

Witnesses:
 W. E. DONNELLY,
 EMMA C. WRIGHT.